(12) United States Patent
Master et al.

(10) Patent No.: US 9,913,056 B2
(45) Date of Patent: Mar. 6, 2018

(54) SYSTEM AND METHOD TO ENHANCE SPEAKERS CONNECTED TO DEVICES WITH MICROPHONES

(71) Applicant: Dolby Laboratories Licensing Corporation, San Francisco, CA (US)

(72) Inventors: Aaron Steven Master, San Francisco, CA (US); Alan J. Seefeldt, Alameda, CA (US); Yu Cecilia Hou, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/227,739

(22) Filed: Aug. 3, 2016

(65) Prior Publication Data

US 2017/0041724 A1    Feb. 9, 2017

Related U.S. Application Data

(60) Provisional application No. 62/202,043, filed on Aug. 6, 2015.

(51) Int. Cl.
*H04R 29/00* (2006.01)
*H04S 7/00* (2006.01)
(Continued)

(52) U.S. Cl.
CPC ........... *H04R 29/001* (2013.01); *G06F 3/165* (2013.01); *G10L 21/0208* (2013.01); *H04R 1/08* (2013.01);
(Continued)

(58) Field of Classification Search
CPC ........ G06F 3/165; G06F 3/167; G06F 3/0346; G06F 3/0383; G06F 3/16; H04R 29/001;
(Continued)

(56) References Cited

U.S. PATENT DOCUMENTS 7,158,844 B1 * 1/2007 Cancilla .................... H04S 7/40
381/303
8,086,171 B2   12/2011 Wang
(Continued)

FOREIGN PATENT DOCUMENTS

| EP | 2560128 | 2/2013 |
|---|---|---|
| WO | 2007/028094 | 3/2007 |
| WO | 2011/139502 | 11/2011 |

OTHER PUBLICATIONS

Kajarekar, S. et al "A Study of Intentional Voice Modifications For Evading Automatic Speaker Recognition" IEEE Speaker and Language Recognition Workshop, Jun. 28-30, 2006, pp. 1-6.
(Continued)

*Primary Examiner* — Mohammad Islam

(57) ABSTRACT

Embodiments are described for calibrating a speaker in a device having a microphone by inputting an original audio signal to a processing component and an output stage of the device for playback through the speakers, receiving playback sound output from the speakers through the microphone to generate a microphone signal, and inputting the microphone signal into the processing component to calibrate the speakers for optimal playback of the original audio signal, wherein the processing component is configured to compare the original audio signal to the microphone signal and correct the microphone signal by one or more audio processing functions in accordance with a refresh schedule.

15 Claims, 7 Drawing Sheets

(51) Int. Cl.
*G06F 3/16* (2006.01)
*G10L 21/0208* (2013.01)
*H04R 1/08* (2006.01)
*H04R 3/04* (2006.01)

(52) U.S. Cl.
CPC ............ *H04R 3/04* (2013.01); *H04R 29/002* (2013.01); *H04S 7/301* (2013.01); *H04R 2430/01* (2013.01); *H04R 2499/11* (2013.01)

(58) Field of Classification Search
CPC ............... H04R 2499/11; H04R 29/00; H04R 2227/003; H04R 2227/005; H04R 2430/01; H04R 25/70; H04R 5/04; H04R 29/008; H04R 3/005; H04R 3/12; H04R 2430/03; H04R 29/002; H04R 29/007; H04R 1/028; H04R 1/08; H04R 1/10; H04R 1/403; H04R 1/406; H04R 2201/028; H04R 2410/00; H04R 2420/09; H04R 2499/13; H04R 2499/15; H04R 25/30; H04R 29/004; H04R 1/02; H04R 1/1016; H04R 1/345; H04R 2225/55; H04R 2420/07; H04R 1/021; H04R 1/025; H04R 1/04; H04R 1/1041; H04R 1/1075; H04R 1/1083; H04R 1/1091; H04R 1/2811; H04R 1/2815; H04R 1/2873; H04R 1/288; H04R 1/28; H04R 2203/12; H04R 2205/021; H04R 2205/024; H04R 2227/001; H04R 2227/007; H04R 2400/00; H04R 2410/01; H04R 2410/03; H04R 2430/23; H04R 2460/01; H04R 2460/07; H04R 2460/15; H04R 25/02; H04R 25/456; H04R 25/50; H04R 25/505; H04R 25/554; H04R 25/604; H04R 27/02; H04R 3/007; H04R 3/14; H04R 5/027; H04R 5/033; H04S 7/301; H04S 2400/13; H04S 7/30; H04S 7/302; H04S 7/303; H04S 7/307; H04S 7/308; H04S 2400/15; G01S 3/023; G01S 3/785; G01S 3/802; G01S 5/0072; G10L 21/0216; G10L 25/48; G10L 25/60
See application file for complete search history.

(56) References Cited

U.S. PATENT DOCUMENTS

| 8,843,952 | B2 | 9/2014 | Pora | |
|---|---|---|---|---|
| 8,893,167 | B2 | 11/2014 | Sinha | |
| 8,977,376 | B1* | 3/2015 | Lin | H04R 29/00 |
| | | | | 381/326 |
| 9,357,306 | B2* | 5/2016 | Tammi | H04R 5/02 |
| 9,497,530 | B1* | 11/2016 | Campbell | H04R 1/1091 |
| 2001/0021905 | A1 | 9/2001 | Burnett | |
| 2001/0038702 | A1* | 11/2001 | Lavoie | H04S 7/301 |
| | | | | 381/307 |
| 2002/0120925 | A1 | 8/2002 | Logan | |
| 2002/0136414 | A1* | 9/2002 | Jordan | H04S 3/00 |
| | | | | 381/58 |
| 2003/0078515 | A1* | 4/2003 | Menzel | A61B 5/0002 |
| | | | | 600/559 |
| 2003/0131715 | A1 | 7/2003 | Georges | |
| 2005/0063552 | A1 | 3/2005 | Shuttleworth | |
| 2005/0254662 | A1* | 11/2005 | Blank | H04S 7/301 |
| | | | | 381/58 |
| 2006/0062405 | A1* | 3/2006 | McKee | G01S 11/14 |
| | | | | 381/103 |
| 2006/0104458 | A1 | 5/2006 | Kenoyer | |
| 2006/0215844 | A1* | 9/2006 | Voss | H04R 25/70 |
| | | | | 381/60 |
| 2007/0022437 | A1 | 1/2007 | Gerken | |
| 2007/0121955 | A1* | 5/2007 | Johnston | H04S 7/301 |
| | | | | 381/56 |
| 2009/0238369 | A1 | 9/2009 | Ramakrishnan | |
| 2010/0049516 | A1 | 2/2010 | Talwar | |
| 2010/0104108 | A1* | 4/2010 | Gratzer | H04R 29/001 |
| | | | | 381/59 |
| 2011/0274281 | A1 | 11/2011 | Brown | |
| 2012/0047435 | A1 | 2/2012 | Holladay | |
| 2012/0072219 | A1 | 3/2012 | Johnston | |
| 2013/0047178 | A1 | 2/2013 | Moon | |
| 2013/0160038 | A1 | 6/2013 | Slaney | |
| 2013/0216055 | A1* | 8/2013 | Wanca | H03G 9/005 |
| | | | | 381/61 |
| 2013/0343566 | A1* | 12/2013 | Triplett | H04N 21/23406 |
| | | | | 381/77 |
| 2014/0119551 | A1 | 5/2014 | Bharitkar | |
| 2014/0245338 | A1 | 8/2014 | Nakamura | |
| 2014/0282660 | A1 | 9/2014 | Oztaskent | |
| 2015/0212789 | A1 | 7/2015 | Jasty | |
| 2015/0281853 | A1* | 10/2015 | Eisner | H04R 25/505 |
| | | | | 381/312 |
| 2016/0021473 | A1* | 1/2016 | Riggi | H04R 3/04 |
| | | | | 381/59 |
| 2017/0026770 | A1* | 1/2017 | Patel | H04R 3/12 |

OTHER PUBLICATIONS

Kowalczyk, K. et al "Sound Acquisition in Noisy and Reverberant Environments Using Virtual Microphones" pp. 1-4, IEEE Workshop on Applications of Signal Processing to Audio and Acoustics, Oct. 20-23, 2013.

Cahill, N. et al "Speech Source Enhancement Using a Modified ADRess Algorithm for Applications in Mobile Communications" AES Convention, Oct. 5-8, 2006, San Francisco, USA, pp. 1-10.

* cited by examiner

SYSTEM AND METHOD TO ENHANCE SPEAKERS CONNECTED TO DEVICES WITH MICROPHONES

CROSS REFERENCE TO RELATED APPLICATIONS

The present application claims priority to U.S. Provisional Patent Application No. 62/202,043, filed on Aug. 6, 2015, the disclosure of all of which is incorporated herein by reference in its entirety.

FIELD OF THE INVENTION

One or more implementations relate generally to audio rendering, and more specifically to enhancing the sound from speakers connected to devices with microphones.

BACKGROUND

Many personal communication and productivity devices have both microphones and speakers to receive and playback audio content. Common examples include mobile phones, notebook computers, game machines, and tablet computing devices. Because of size, portability, and power efficiency considerations, the speaker and audio processing components of such devices are often not optimized to produce high quality sound. The speakers are often small single element transducers that are placed behind or within substantial enclosures, and located in suboptimal locations such as the side or rear of a device. To improve the playback experience of these devices, external speakers are often used. Such speakers are typically connected to the mobile device through an audio port via cabling, or over a wireless link, such as a Bluetooth connection, though other similar methods are also possible. These speakers are often relatively small and portable themselves, such as small desktop or bookshelf size speakers, or can they can be on the scale of car stereo or home system speakers. The use of external speakers usually cuts out the operation of any internal speakers present in the device, but can also supplement such internal speakers. To reproduce the broadest range of audio in most listening environments, such external speakers are generally designed and configured to have a flat frequency response and not compensate for any spectral coloration caused by device configuration or application. However, the variety of different types of portable devices and operating conditions during use has added greater challenges to accurate sound reproduction through such devices. The faithful rendering and playback of audio can be a challenge in environments that feature different audio playback scenarios, such as different client devices (e.g., mobile phones, portable or desktop computers, gaming consoles, and so on), as well as audio content (e.g., music, games, dialog, environmental noise, and so on). Furthermore, small portable devices are generally incapable of matching their performance to the acoustics of their environment.

Although certain methods exist to improve sound from speakers connected to devices with microphones, such prior art systems typically rely on using predefined test signals, such as pink or white noise. Such test signals are often used to try to achieve a desired sound profile, and are chosen for specific audio properties, such as containing a large range of frequencies in a short amount of time (e.g., impulses, chirps, swoops, broadband noise), or being robust to time shifting (steady state pink noise) or both. The use of such test signals generally interrupts the user's listening experience by requiring specific dedicated tuning periods in which program content is not played.

What is needed, therefore, is a tuning and calibration system that improves the sound emanating from external speakers used with portable devices that have internal microphones or microphone interfaces. What is further needed is a speaker tuning system that does not always require test signals that interrupt the listening experience.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF EMBODIMENTS

Embodiments are described for calibrating a speaker connected to a device having a microphone by inputting an original audio signal to a processing component and an output stage of the device for playback through the speakers, receiving playback sound output from the speakers through the microphone to generate a microphone signal, and inputting the microphone signal into the processing component to calibrate the speakers for optimal playback of the original audio signal, wherein the processing component is configured to compare the original audio signal to the microphone signal and correct the microphone signal by one or more audio processing functions in accordance with a refresh schedule. In the case of an initially unknown or inaccessible test signal or sound file, the system may perform automated content recognition or metadata processing or both to convert the arbitrary sound file to the sound file known to the device. The sound file may be a streaming content, sourced content, or a user sourced sound file and may comprise one of music, dialog, ambient sound, and effects. The optimal playback of the original audio signal comprises tuning a characteristic of the original audio signal to produce output sound sufficiently pleasing to the user relative to a qualitative scale, and the characteristic may be one of: frequency response, frequency distribution, gain, and timbre. In an embodiment, certain device characteristics stored in one or more databases may be provided to the processing component to further inform the tuning algorithm of the calibration process. The device characteristics may comprise at least one of speaker characteristics and microphone characteristics, such as make, manufacturer, and type of device, and the databases may be populated with data provided from at least one of: a manufacturer, a certification body, and a group of users. Embodiments further include providing a lightweight representation of the audio signal to be processed and providing limits to the audio processing functions performed on the audio signal.

In an embodiment, the method further comprises determining the presence of suspicious audio data input to the microphone, and filtering the suspicious audio data to preserve integrity of the microphone signal input to the processing component. The suspicious audio data may be background noise, talking, wind noise, and physical movement noise. The method further comprising determining if sufficient information exists for the processing component to provide to the original audio signal to calibrate the speakers based on a signal to noise ratio of the microphone signal, and in the case that insufficient information exists, waiting until sufficient information exists or prompting the user to increase volume of the original audio signal until sufficient information exists. If insufficient information exists, the method further comprises inputting a supplemental signal to the processing component, the supplemental signal comprising one of: a pre-defined broadband signal, a combined test signal and the output signal, a spectrally flattened version of the output signal, and a frequency boosted version of the original audio signal.

In an embodiment, the speakers are calibrated for optimal playback of the original audio signal according to a defined tuning update schedule comprising at least one of: a prompted update, a continuous periodic update, and an automated update. The update may be triggered by at least one of: change of location of the device, change in content comprising the original input audio, change of time of use of the device, and change in type of speaker or microphone. For the device, the speakers may comprise one of an internal speaker integrated in the device or an external speaker connected to the device through a wired or wireless link, and wherein the microphone comprises one of an internal microphone and an external microphone connected to the device through a wired or wireless link.

Embodiments are further directed to systems and articles of manufacture that perform or embody processing commands that perform or implement the above-described method acts.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for enhancing sound from speakers connected to devices with microphones, though applications are not so limited. Aspects of the one or more embodiments described herein may be implemented in an audio or audio-visual system that processes source audio information in a processing and playback system that includes one or more processors executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Embodiments are directed to an audio processing system including calibration (tuning), filter and equalizer components that optimize the playback of sound in devices that contain internal microphones or are directly connected to external microphones. These components enhance sound from speakers connected to devices with microphones. While other such systems have used predefined test signals, improved methods described herein expand such test signals to include arbitrary sounds more convenient for the user, such as a user's own music. Optionally, unknown arbitrary sounds may be converted to known sounds by using automated content recognition or metadata about the sounds or a combination of the two. When performing optimization operations, the system shall estimate whether it has sufficient data to tune the speaker sounds; in some cases it will optionally perform any of several potential modifications to the test signal to make tuning possible while providing an intuitive audio and or visual user experience. When relevant, the system combines database-sourced information about the speakers with information received from the microphone when performing tunings, and optionally shall improve the database by using observations made by manufacturers or consumers or both. Because both the microphone system and the speaker affect the sound processed, the system shall, when relevant, also employ and facilitate a database of microphone system responses to account for the role played by such components. The system may have a number of modes of operation to allow user-requested or automatic refresh, with the latter based on device location, device type, frequency content, or time. The system interface shall allow the user to choose for the system to refresh on command, employ previous tunings, or refresh automatically.

Figure 1:
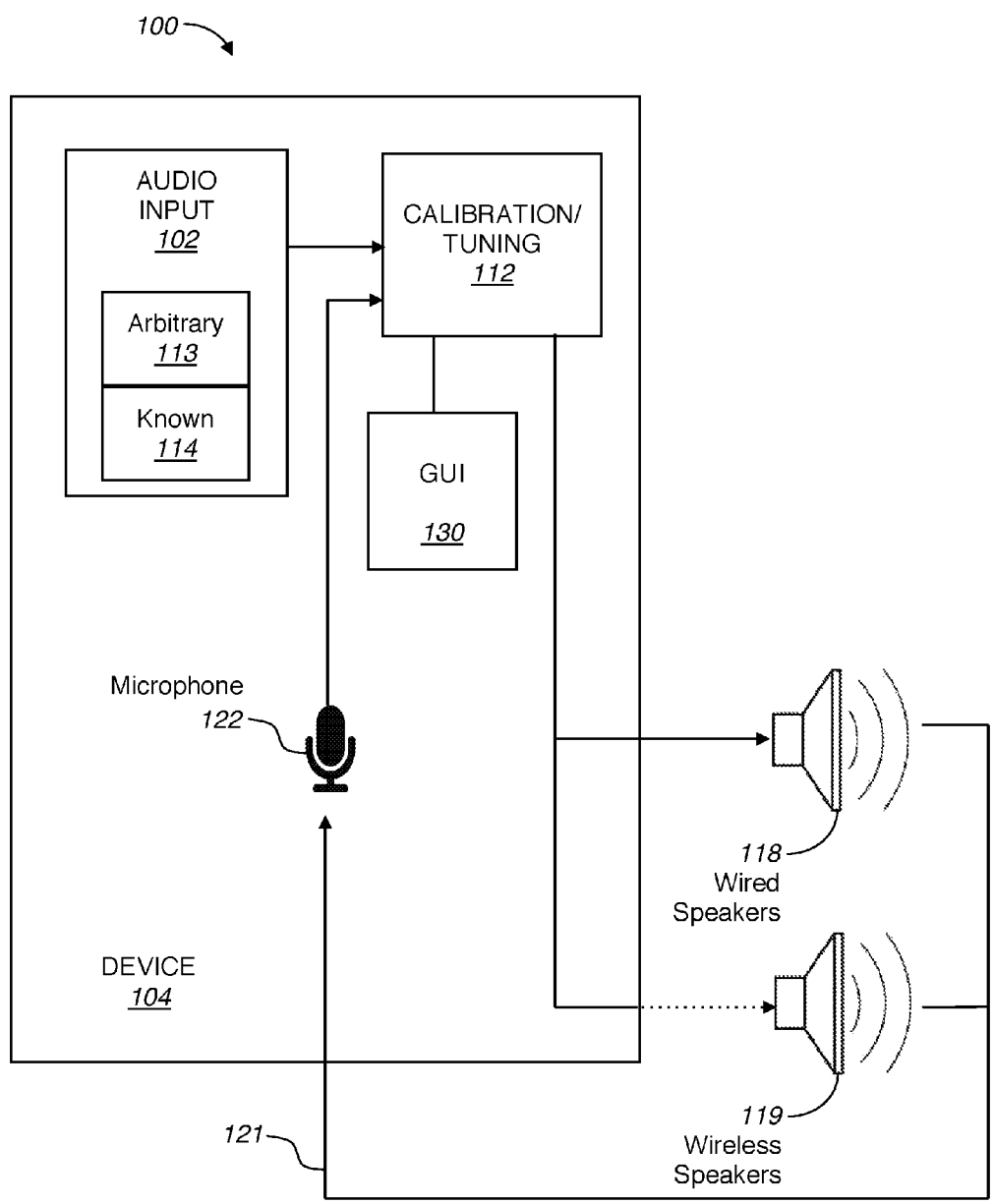
FIG. 1 illustrates an overall system that incorporates embodiments of an audio processing system including calibration components that optimize the playback of sound in devices that contain microphones under some embodiments.

For the embodiment of FIG. 1, the input audio sound 102 may be audio content including monophonic, stereo, channel-based or object-based sound. Such a system may be used in conjunction with an audio source that includes authoring tools to create audio content, or an interface that receives pre-produced audio content. FIG. 1 illustrates an overall system that incorporates embodiments of an input audio interface and playback system, under some embodiments. As shown in system 100, an audio input 102 represents audio content for playback through a portable device 104 for a user to listen to through speakers 118 or 119. The device 104 is generally a portable audio or music player or small computer or mobile telecommunication device that runs applications that allow for the playback of audio content. Such a device may be a mobile phone or audio (e.g., MP3) player, a tablet computer (e.g., Apple iPad or similar device), music console, a notebook computer, or any similar audio playback device. The audio may comprise music, dialog, effects, ambient sound, game/soundtrack content or any digital audio that may be desired to be listened to through connected external speakers, and such audio may be streamed wirelessly from a content source, played back locally from storage media (e.g., disk, flash drive, etc.), or generated locally. The speakers may be wired speakers 118 that are integrated in the device or connected to the device through a physical link (speaker cable), or they may be wireless speakers 119 that are connected to the device over a wireless link. Such a wireless link may by a short distance wireless protocol such as Bluetooth, or it may be a remote streaming control (such as with a Chromecast connected to a TV which is connected to speakers). The speaker or speakers may be embodied as any appropriate driver or driver array, where the drivers may include cone, ribbon, or horn-based transducers. The drivers may be single element or multi-element components incorporating different drivers for different frequencies or power handling characteristics, e.g., tweeter, mid-range, woofer, etc.). Separate (non-integrated) speakers may be enclosed within their own enclosure or speaker cabinet.

For the embodiment of FIG. 1, the audio output from the speakers is generally radiated outward as well as fed back to the microphone 122 over feedback path 121. The microphone 122 is typically an internal microphone, but may also be an external connected microphone. The audio input 102 generally comprises a local music (or other audio content) file on the device. Alternatively it may be streamed to the device via a streaming service. The audio input comprises a digital audio file and includes an arbitrary signal 113 and a known signal 114. The device 104 also includes a calibration (or tuning) component 112 that receives both the audio input 102 and the microphone signal. A comparator circuit or function in this component compares the audio input signal to the microphone signal, which represents what is being played through the speakers 118 or 119. A graphical user interface 130 and associated display may also be provided as part of device 104.

In an embodiment, headphones may be used instead or as well as external speakers. Such headphones may include open or closed headphones, over-ear or in-ear headphones, earbuds, earpads, noise-cancelling, isolation, or other type of headphone device, and may be wired or wireless with regard to its connection to the sound source or device 104. Playback through headphones may represent a special case in which speaker feedback may be provided by means other than an external feedback path 121, but rather such as through a separate headphone monitoring link. In general, the headphone embodiment requires a microphone to be placed inside the headphones themselves so that the microphone can detect the sound.

In an embodiment, the audio processed by the system may comprise monophonic (single channel) audio, stereo (two-channel) audio, or even channel-based audio, object-based audio or object and channel-based audio (e.g., hybrid or adaptive audio). In the case of object or adaptive audio, the audio comprises or is associated with metadata that dictates how the audio is rendered for playback on specific endpoint devices and listening environments. Channel-based audio generally refers to an audio signal plus metadata in which the position is coded as a channel identifier, where the audio is formatted for playback through a pre-defined set of speaker zones with associated nominal surround-sound locations, e.g., 5.1, 7.1, and so on; and object-based means one or more audio channels with a parametric source description, such as apparent source position (e.g., 3D coordinates), apparent source width, etc. The terms "adaptive audio" or "immersive audio" may be used to mean channel-based and/or object-based audio signals plus metadata that renders the audio signals based on the playback environment using an audio stream plus metadata in which the position is coded as a 3D position in space. In general, the listening environment may be any open, partially enclosed, or fully enclosed area, such as a room, but embodiments may also include playback through headphones or other close proximity end-point devices. Audio objects can be considered as groups of sound elements that may be perceived to emanate from a particular physical location or locations in the environment, and such objects can be static or dynamic. The audio objects are controlled by metadata, which among other things, details the position of the sound at a given point in time, and upon playback they are rendered according to the positional metadata. In a hybrid audio system, channel-based content (e.g., 'beds') may be processed in addition to audio objects, where beds are effectively channel-based sub-mixes or stems. These can be delivered for final playback (rendering) and can be created in different channel-based configurations such as 5.1, 7.1, and so on.

For the embodiment of FIG. 1, device 104 contains an internal microphone 122 or is connected to an external microphone for receiving audio signals, such as the played back audio content, user voice commands, background noise, or other audio. The microphone 122 is generally configured to pick up audio output from the device, such as from speakers 118 or 119 for use by the calibration (tuning) component 112. The microphone may be a single element or may include two or more mics. In general, the term microphone or mic refers to a microphone system that may include other technology components between the sound going into the mic, and where its signal is received that impact the signal, such as a mic enclosure, filters, and processing applied by a device's operating system. As shown in FIG. 1, the microphone 122 informs an algorithm within the calibration component 112 that controls the speaker(s) 118, 119. The calibration component 112 constitutes a signal processing unit that may be embodied as a processing component or circuit within the device or speaker, or that may be provided remotely, such as on another device or in a network (e.g., the cloud). As opposed to using standard test signals (e.g., pink noise) to tune the system, calibration component 112 uses arbitrary sounds 113 more convenient for the user, such as a user's own music, or known sounds 114 generated, for example, by using automated content recognition or metadata about the sounds. Embodiments further include providing a lightweight representation of the audio signal to be processed and providing limits to the audio processing functions performed on the audio signal by the calibration component.

Figure 2A:
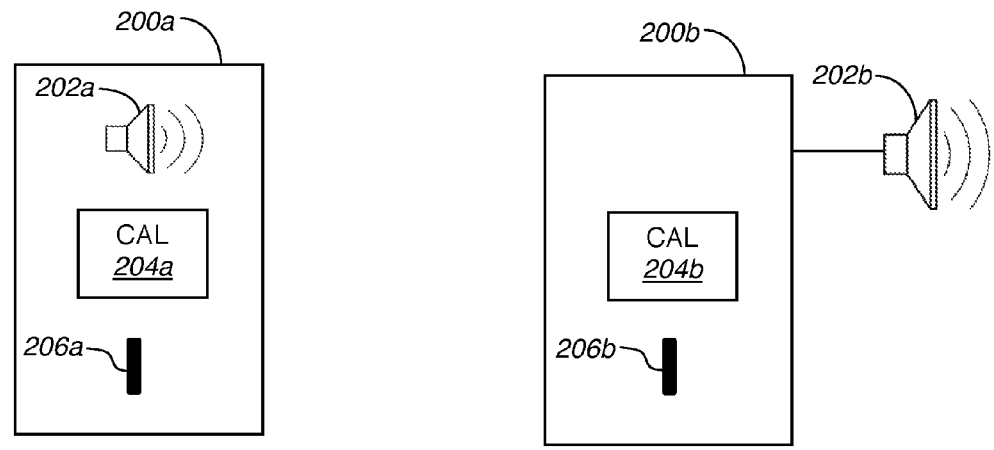
FIG. 2A illustrates common configuration variations of the device and calibration process, under some embodiments.
Figure 2A:
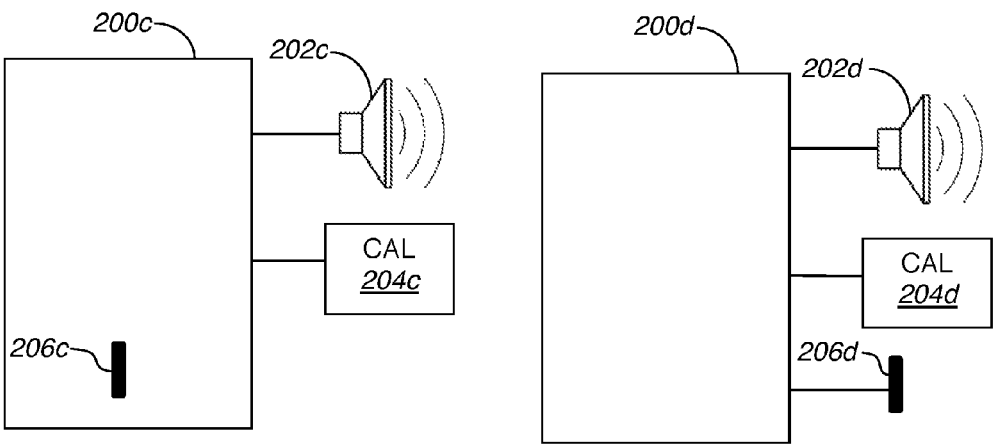

As shown in FIG. 1, the device 104 may be embodied as a mobile (cellular) phone, or any other similar portable device having both speakers and microphones, or interfaces to speakers or microphones. Various different configurations are thus possible for the device 104 that is used in conjunction with the calibration process 112. FIG. 2A illustrates common configuration variations of the device and calibration process, under some embodiments. As shown in FIG. 2, a first configuration 200a may be a device that includes an integrated speaker 202a, an integrated microphone 206a, and an integrated calibration component 204a, where integrated means devices or components that are part of or embodied within an enclosure or circuit board defining the device. A configuration 200b may be a device that has an integrated microphone 206b, an integrated calibration component 204b, and an interface to an external speaker 202b (e.g., wired port, or wireless link). A configuration 200c may be a device that includes an integrated microphone 206c, and an external speaker 202c, and an interface to a calibration process 204c that resides externally, such as in the cloud or on another device. Finally, configuration 200d may be a device that has no resident components in that the speaker 202d, the calibration process 204d, and the microphone 206d are all external to the device and are accessed through appropriate interfaces. FIG. 2A is intended to be an example of certain device configurations, and other configurations or combinations of configurations are also possible. As should be noted, with respect to the three main components of microphone, speaker, and calibration component (processor) each of which may be internal to the device or external to the device, there would be a total of eight permutations of configurations as shown in Table 1 below.

TABLE 1

Device Configuration

| Speaker In | Speaker Out | Speaker Out | Speaker Out |
|---|---|---|---|
| Processor In | Processor In | Processor Out | Processor Out |
| Mic In | Mic In | Mic In | Mic Out |
| Speaker In | Speaker In | Speaker In | Speaker Out |
| Processor Out | Processor Out | Processor In | Processor In |
| Mic In | Mic Out | Mic Out | Mic Out |

In general, the goal of the calibration component 112 is to improve the sound emanating from a speaker 118 near a microphone 122 of a device 104. Embodiments may be described with reference to a microphone attached to a handheld device wherein the same device contains a player which is outputting the sound, but any configuration such as shown in FIG. 2A may be applicable, such as having the player exist on the speaker, or on another device. In an embodiment, the calibration component 112 uses a known signal 114 or the user's own music or content (or other arbitrary signal 113) to tune the speakers. If necessary, an automated content recognition (ACR) process and metadata can be used to ensure that the arbitrary signal is "known."

In an embodiment, the overall requirements for the system 100 are that the device has both original signal and speaker output signal knowledge. In this case, the device (e.g., tablet or smartphone) has information about a desired sound signal being output to a speaker. This can be in the form of the bitstream of the signal, or of a reduced representation such as frequency band magnitudes at various points in time. Depending on the operating system of the device, the device may have access to some, all, or none of this information. Most handheld devices with Bluetooth or other speaker connectivity (or similar capabilities) fit in one of these categories. Additionally, the device has microphone signal and system information. In this case, the device has access to the signal as captured by a microphone. As described above, the microphone may be incorporated into the device itself (such as on most smartphones and tablets), or connected via a cable or wireless connection, or an Internet-based connection may be used. The system also has knowledge of the frequency response of the microphone system, as described to include the microphone transducer, mic enclosure, and any processing automatically applied (such as by the firmware, which sometimes filters microphone input) to the microphone signal. This way the processing system shall know whether certain observed distortions in the signal from the microphone system are due to the capabilities of the microphone system itself.

The calibration component or process comprises a processing system in which the device may use local or cloud (or local network) processing to compare the desired and microphone-received sounds, and give instructions to update the sound being sent to the speaker. To do this, the system shall use any number of techniques familiar to those skilled in the art to calculate the optimal audio filter functions, given knowledge the system has at a given moment. An example of a filter techniques that may be used in conjunction with the calibration process is described in PCT Patent Publication WO 2010/120394 for inventors Brown, Ekstrand, and Seefeldt, which is assigned to the assignee of the present application, and which is incorporated by reference in its entirety.

Figure 2B:
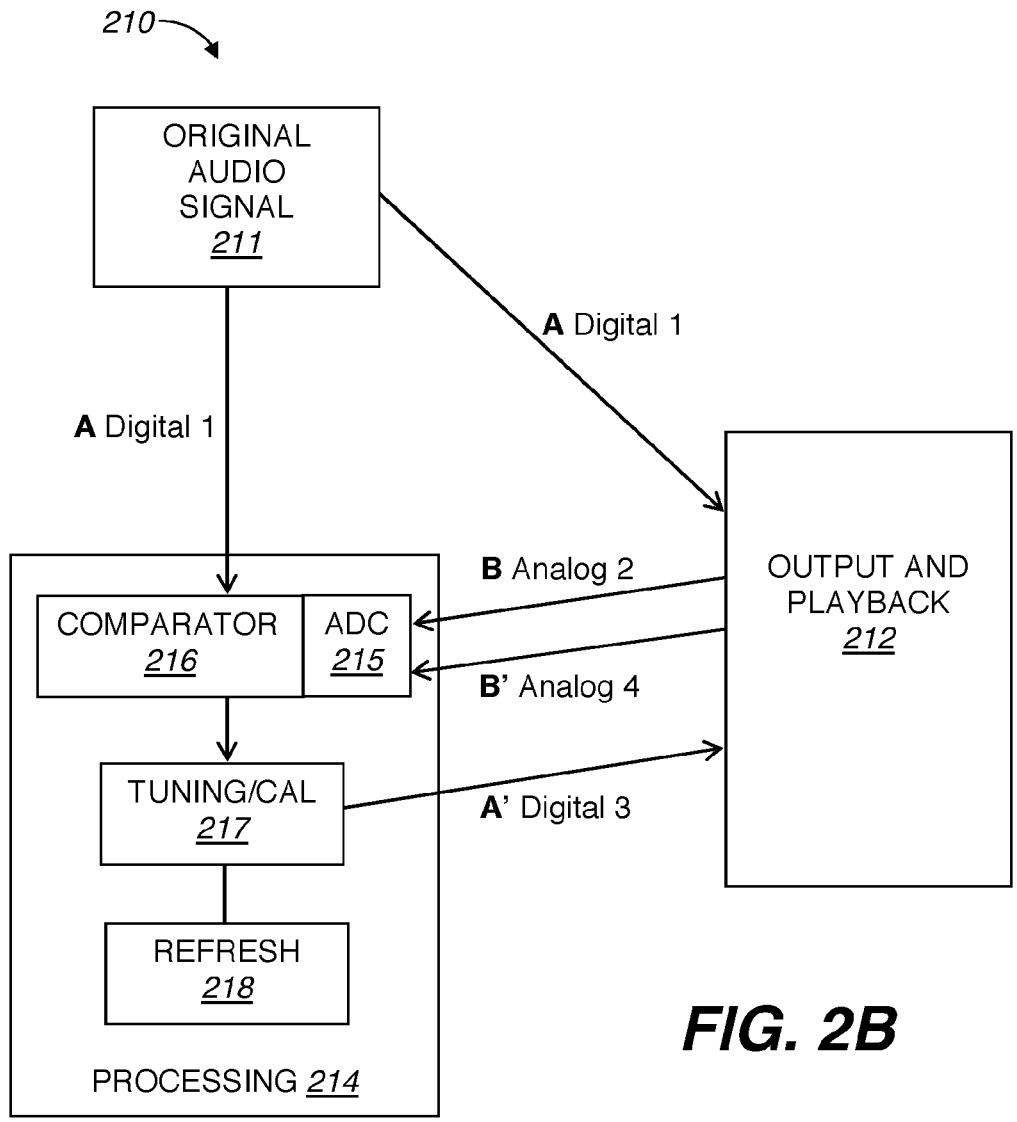
FIG. 2B illustrates an overall audio tuning/calibration system and process, under some embodiments.

As described in the Background section, prior art systems use predefined test signals such as pink noise for the desired sound mentioned. In contrast, the calibration system 112 uses sound that a system user chooses to listen to, rather than a predefined test signal. This is possible, because the system still has, to a workable extent, the required elements to perform sound optimization, that is, first the "ideal" sound leaving the device, in digital (or analog) form, and second the microphone input of what is coming out of the speaker(s). FIG. 2B illustrates an overall audio tuning/calibration system and process, under some embodiments. As shown in diagram 210 of FIG. 2B, an original digital audio signal 211 is played through the output and playback stages 212 of a device (e.g., amp and speakers) as an original signal A (denoted "digital 1"). The output from the speaker is heard by the user and received back through the microphone as an analog signal B (denoted "analog 2") in a processing component 214 of the device. The analog 2 signal is converted to digital form in an analog-to-digital converter (ADC) 215, which may be part of the processing component 214 or an external component. The original audio signal A sent to the speakers 212 is compared to the received signal B (after digital conversion) in a comparator circuit 216. Due to operating conditions, device characteristics, ambient effects and other possible distortion or interference, the transmitted signal A may differ to some extent from the received signal B. A tuning/calibration circuit 217 is used to correct the effects of any such distortion by filtering, equalization, phase shift or other similar means. The processed (or "tuned" or "calibrated") digital signal A' (denoted "digital 3") is then output for playback 212 as analog output B' (denoted "analog 4") so that the user first hears signal A and then the corrected signal B' thereafter. The processed signal B' may itself be continuously monitored and tuned to match the original audio signal A on a periodic basis as set by a refresh circuit 218. In this manner the output digital signal A' (and resulting analog speaker output B') can be constantly tuned to match the original signal A and to compensate and correct for different operating environments, noise levels, degrading conditions, and so on.

It should be noted that, for clarity and illustrative purposes, FIG. 2A depicts one copy of signal A flowing directly from the source of the original audio to the output and playback module. In some embodiments, signal A might only flow to the comparator and calibration modules, which, for the special initial case, simply pass it directly to the output and playback module unmodified, because there is no other signal to compare it with.

In an alternative embodiment, the original audio signal may be arbitrary signals that are processed through an ACR (automatic content recognition process) in order to provide the signal A that is compared to the received signal B. The signal may be provided in a lightweight signal representation. In yet a further alternative embodiment, databases may be provided for different microphones and speakers in the system to provide information for the tuning/calibration component 217.

Diagram 210 of FIG. 2B incorporates a flow diagram with respect to generation of certain digital and analog audio signals in the processing and playback components. The process starts with the original audio signal A (digital 1), which is fed to both the speakers 212 and the comparator 216. The speaker outputs signal B (analog 2), which is captured by the mic and converted to digital and sent to the comparator. The comparator then compares B with A, and the tuning/calibration component 217 modifies the output A based on the comparison, thereby creating A' (digital 3). The system then sends out A' to the speakers. In an update step, the speaker outputs B' (analog 4). These steps are repeated whenever there is a refresh 218 so that the played back sound (B then B') is constantly compared to the original audio signal A.

Figure 3:
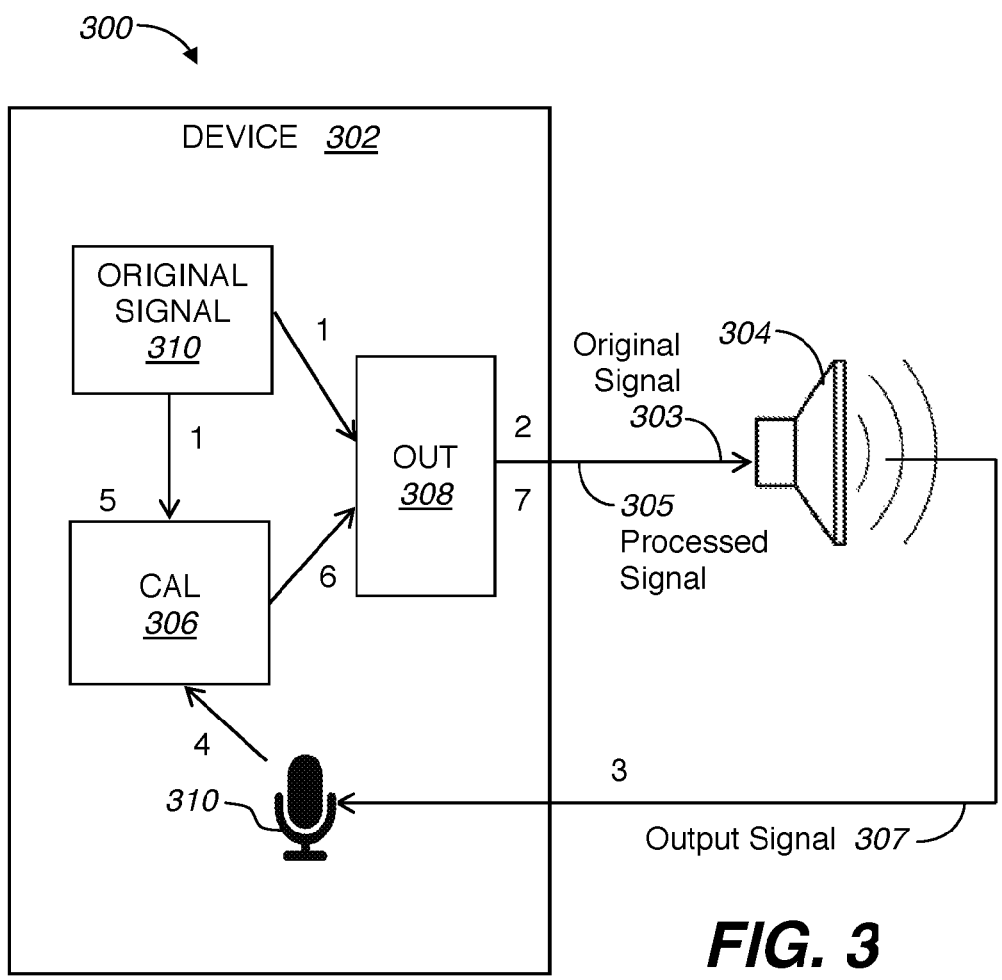
FIG. 3 illustrates a calibration system that compares desired and microphone-received sounds to optimize sounds sent to output speakers, under some embodiments.

FIG. 3 illustrates a calibration system that compares desired and microphone-received sounds to optimize sounds sent to output speakers, under some embodiments. As shown in system 300 of FIG. 3, an original signal from source 310, which may correspond to audio input signal 102 of FIG. 1 or some other user-sourced signal is input into both a processing component (calibration or cal component) 306 and device output stage 308 of a device 302. The device output stage 308 generally comprises buffers, connections, power supply, and physical and/or wireless ports for connecting to and driving internal, integrated, or connected external speaker(s) 304. The sound waves from the speaker comprise audio output signal 307 that is then picked up by the microphone 310 that is integrated in or connected to the device 302. This mic signal is then fed to the processing component 306.

In an embodiment, the processing component 306 compares the desired sounds to the microphone-received sounds, where the desired sounds correspond to the original signal 310 and the microphone received sounds represent the output signal 307 as the original signal was initially played back by the output stage 308 and speaker 304 in the actual listening environment. The processing component 306 then gives instructions to update the received microphone signal to match the original signal. The processing component 306 is part of an overall calibration/tuning process that may perform certain defined audio processing operations to optimize the sound sent to the speakers. These operations can include audio processing functions such as downmixing, graphic equalization, parametric equalization, gain/loudness/dynamic range control, phase control, filtering, and any combination thereof, or other functions prior to transmission of the processed signal 305 to the speaker 304. The processed signal 305 is then transmitted to the output stage 308 for playback through speaker 304. In this way, the output stage continuously outputs an output signal that is calibrated to match the original signal by way of the comparator and audio processing (e.g., EQ, phase, gain control, etc.) of the processing component 306.

The single digit numeral indicators in FIG. 3 illustrate the signal and processing flow under an embodiment. In a first step, the original digital signal 310 is first output (1) to the calibration component 306 and output stage 308. In a second step, the output 308 sends the original signal as a speaker feed 303 (2) to speaker 304. In a third step, the speaker 304 outputs an analog signal 307 (3) that is heard by the user and received by mic 310. In a fourth step, the mic sends the received signal (4) to the calibration circuit 306, along with any requisite ADC process. In a fifth step the received signal is compared to the original (5) and tuned appropriately. In a sixth step, the tuned audio signal is sent to the output stage (6), and in a seventh step, this processed signal 305 is then sent to the speaker 305 playback, and recalibration in subsequent tuning steps as dictated by a refresh schedule. In general, the refresh schedule may be a defined periodic schedule (e.g., every minute, every five minutes, etc.), or it may be a dynamic schedule that is triggered by events not specifically known in advance, such as a location or location change of the device, or the frequency components in the audio content.

In contrast to test signals that interrupt the user experience, it is advantageous to use sound that a user already desires to play back, for example, a particular favorite song, or any other content making up the original signal 310. For present purposes, such songs or sound are termed "arbitrary test signals." While this is convenient for the user, there are some disadvantages to using arbitrary test signals that must be mitigated for sound improvement techniques to be effective. These include: only modifying speaker output for frequencies that exist in the test signal (as they cannot be guaranteed to exist as in a predefined test signal); ensuring that the test signal and test input are time aligned (some predefined test signals are noise-like and some comparators do not require that such signals be time-aligned); and only functioning during non-silent parts of the test signal. To overcome or counteract these potential disadvantages, the processing component 306 is configured to perform certain intelligent filtering of suspicious data, among other functions (as described in greater detail below).

For the embodiment of FIG. 3, the original signal source 310 comprises known audio content so that the device has information about the desired sound signal being sent to the speaker. In certain instances, however, such known audio content may not be available so that the device is not working with known information, and the device does not have automatic or immediate access to the test signal, even though it is outputting the signal. For example, for some streaming music services, it may be impossible for the system to access the output sound stream even though the system may access the microphone input signal, or the system may have access to information about which service is streaming the audio (e.g., Pandora), or what signal is streaming, or the timing thereof, but not the signal itself. In this case, the system may be configured to use metadata and/or automated content recognition (ACR) mechanisms to make unknown signals known. For this embodiment, the system may enter a special mode of operation, wherein it utilizes ACR technology, possibly in conjunction with a service that delivers the essence of tracks, to convert an unknown signal into a known signal.

Figure 4:
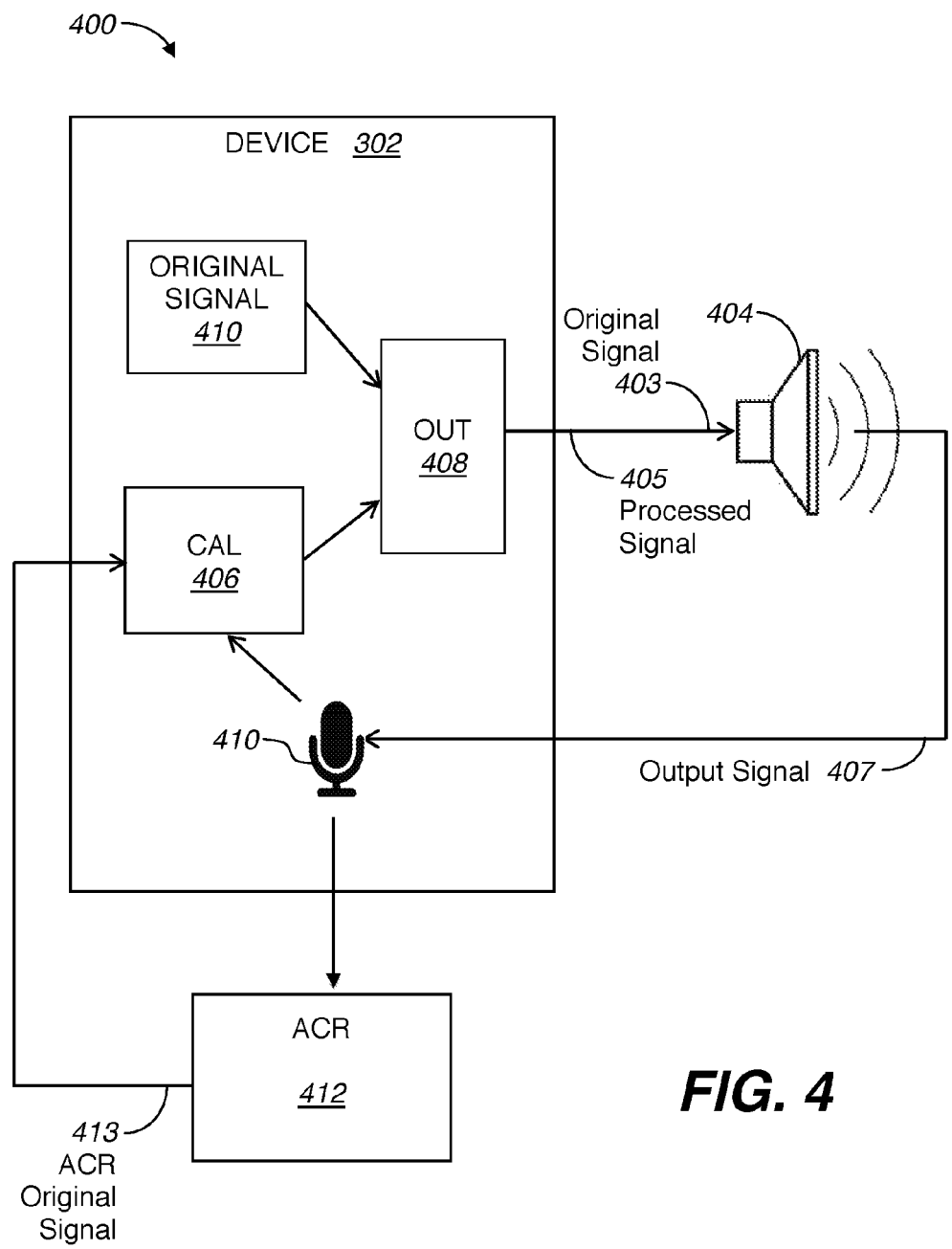
FIG. 4 illustrates a system that uses ACR to derive an original signal for use in a calibration system, under some embodiments.

FIG. 4 illustrates a system that uses ACR to derive an original signal for use in a calibration system, under some embodiments. As shown in system 400 of FIG. 4, an original signal from source 410, which is not known to the device is input to device output stage 408 of a device 402 for transmission to speaker(s) 404. The output signal 407 from the speakers 404 is picked up by microphone 410 and this signal is passed to the processing component 406 and also to an external ACR process or service 412. The ACR process 412 determines the content of the output signal 407 and passes the actual sound audio stream for the matching part of the audio content (e.g., song or TV show, etc.). This is thus a two-step process in which the system identifies the content (ACR) and delivers the actual reference sound to be compared, along with any other metadata such as name, artist, and so on, if available.

For the embodiment of FIG. 4, the original signal 410 is sent to the output stage 408 and speaker 404 initially as original signal 403. The output signal 407 is then received by microphone 410, which transmits the signal to both the processing component 406 and ACR component 412. Once the content is recognized by the ACR, and the reference sound bits are obtained, the reference sound (possibly in a reduced representation, as described below) is sent, along with microphone signal received, to the processing component 406 which then applies the appropriate audio processing functions to make the output signal 407 more closely match the reference signal from the ACR 412.

For the system of FIG. 4, in an embodiment in which the system 400 knows nothing about what signal is being output by the device 402, an ACR service 412 may be used possibly in conjunction with a streaming or download service, or access to local copies of signals (tracks), to obtain a copy of the original signal essence itself, along with an indicator of timing. This is then to be used by the system as the original, desired signal. With respect to certain application implementations and the operation of the processing component 406, if the system is aware that a service (e.g., Pandora) is streaming a particular song then it could use this information to obtain the original track from a streaming service, and create a locally cached copy for comparison with the microphone signal. If the information is not specific enough to generate a single track, it could be combined with ACR as follows: (1) it could instruct the ACR service to perform a less expensive search over a smaller data set, for example searching only songs known to be streamed by the service (e.g., Pandora), or only songs with metadata (e.g. title or artist or both) similar to the known metadata; (2) alternatively, it could filter results provided by a complete (full cost) search by an ACR service, to obtain a more specific or unique version of the content. If the system knows the timing information for the song is playing (e.g., that a song has been playing for N seconds), then it could similarly narrow the search as in the previous point. That is, it could only attempt to search, or filter results that contain, particular portions of songs corresponding to the indicated timing.

A more efficient option also exists for the above cases, in that there is not necessarily a need to obtain the original essence output by the device to the speaker. This is because the processing component 406 may reduce the original signal representation as part of the processing, for example only considering the magnitude of the signal in several frequency bands. Therefore, only this lightweight representation, which may be an order of magnitude smaller than the original signal, need be transmitted to the processing module. This reduces load on the network used to deliver data to the processing module, and reduces computational expense. It also may facilitate compliance with agreements or regulations involving the transfer of copies of artistic works.

With respect to the intelligent filtering of suspicious data, because the system relies on a microphone listening to speakers, interfering sounds like background noise, talking, wind, and physical movements in the area all pose a challenge. To counteract this, the system, in an embodiment, includes methods to filter out such suspicious data. These methods filter data based on frequency components present and on SNR. To ensure that only relevant comparisons are being made, the system will time-align the microphone signal and the output signal, using any number of techniques familiar to those skilled in the art, such cross correlation in the time or frequency domain. After using existing techniques to align signals and filter data, the system will be in one of three states denoted an insignificant information state, a sufficient information state, and a significant but insufficient information state. While the system is assessing its state, no correction shall be applied to frequency bands where the SNR (signal-to-noise ratio) is too low.

With respect to the insignificant information state, this state occurs because no sound is detected from the microphone signal (with respect to some pre-defined threshold), or the SNR is below threshold X in too many Y of frequency bands Z. In this case, the system shall continue listening. If it receives enough information within W attempts, it shall transition to one of the other states. Otherwise, the system shall deliver a helpful error message to the user. Such an error message could advise the user to increase the volume of the sound system, avoid interfering sounds, or check the speaker connection, and may be provided by an associated graphical user interface (GUI), such as GUI 130 of FIG. 1.

With respect to the sufficient information state, in this state, the system has enough information to act, and it performs modifications of the output signal to achieve optimal sound through the processing component which performs certain audio processing operations such as filtering, equalization, downmix, gain control, and so on. No further action is required until the next refresh, which may be continuous, or periodic, or occasional, or never, as described in greater detail below.

With respect to the significant but insufficient information state, if the system is in this state, a preferred action is that it shall output one of a number of optional sounds to the speakers, to facilitate achieving a high enough SNR in enough frequency bands to make a tuning reliable. There are several options for such sounds, and each of these options may be paired with visual information presented to the user via the GUI 130, to make the experience more convincing. Such sounds include a predefined broadband signal, which may be a chirp, an impulsive sound, or pink noise (or a real world example signal with similar characteristics, such as rainstorm sounds) for example. Additionally, and optionally, this shall be presented to the user as a "success" signal; or, as in the example of rainstorm sounds, it may be presented with a visual confirmation that a new signal is being used to optimize sound. For example, the system might use a rain icon with an "optimizing sound" message. Alternatively, the sound may be a combination of the predefined test signal and the output signal in which any of the previous sounds could be added to the user's signal. In this case, the test signal would be an additive combination of the predefined broadband signal and the user's test signal. The sound may be a spectrally flattened version of the output signal. In this case, the system could perform spectral flattening on the user's test signal, and output this sound. One benefit of this is that such signals tend not to sound "optimal" to listeners, so the tuned signal presented after the flattened signal will generally sound "better" than the earlier signal. To make sure that the user is not alarmed by the worse sound in the meantime, a visual message could be presented. The sound could also be a version of the user's signal with virtual bass and extra harmonics. This is similar in concept to the previous two sounds. If the user's test signal lacks sufficient content or SNR at certain frequencies, one way to create such content without sounding "overly different" is to create tones at harmonics of existing pitches in the signal. This can be done using known techniques like spectral replication, which is used to create virtual bass. As in the previous sound item, this may make the user's content sound different, and should be accompanied by a message to the user that the sound is being optimized.

Database Use

In an embodiment, the speaker calibration system is configured to access and use both a database of speaker tunings and microphone input. In certain cases, a database is used to store ideal speaker tunings for a number of speaker devices. When a playback device becomes aware, such as via a Bluetooth handshake, that it is connected to a device with a tuning in the database, the device may fetch the tuning from the database and apply it to its output, improving the speakers' sound. This may be called the "default tuning" for that speaker device.

First, the system will use both the database of tunings and respond to data from the microphone as described above. It will modify player output in addition to the default tuning, but limit how much it modifies the sound. For example, the system shall not deviate from the default tuning of a given speaker device by more than 10 dB, or some other threshold. This limit is imposed primarily for two reasons, namely device limits and reliability limits. With respect to device limits, there are certain limits on the device in terms of what it can output. Certain modifications will not be helpful because the device cannot act on them. For example, the system might detect that much more bass sounds are needed, but the device cannot output them because it does not have drivers capable of this. With respect to reliability limits, the data from the speaker tuning database may be more reliable, even though measures are taken to reduce the influence of environmental noise.

Optionally, the database may allow contributions from multiple sources. These include manufacturers who may perform tests in a lab, using specifications provided by the present inventors; active consumers (e.g., crowdsourcing) who are users with known microphone systems, devices, and firmware may contribute by actively choosing to participate, and volunteering to use certain predefined test signals with as little background noise as possible, in a non-reverberant room; passive consumers who are users that use the system as normal and without any special instructions. By combining many device profiles and speaker profiles, the system could achieve greater accuracy.

Figure 5:
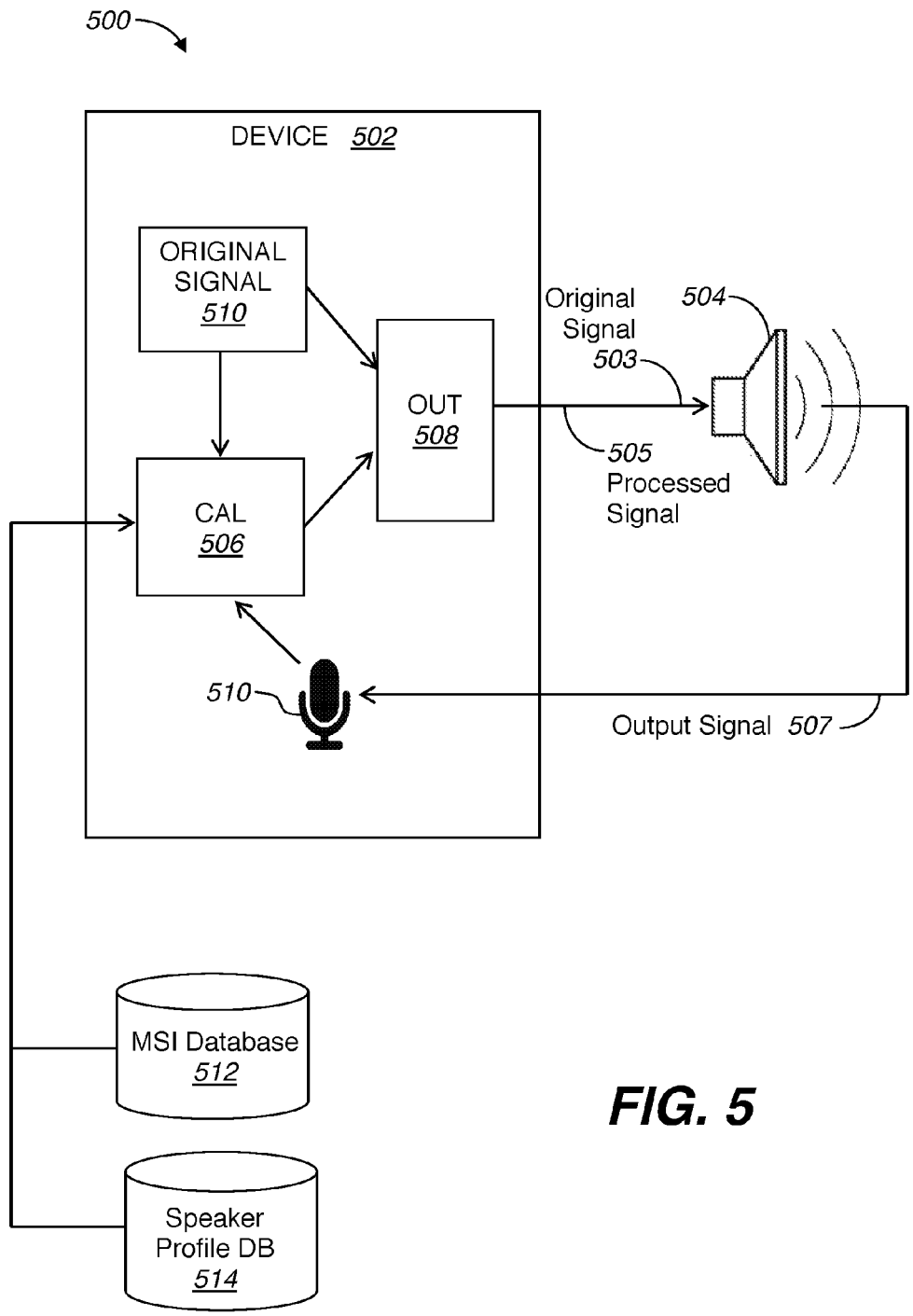
FIG. 5 illustrates a system that uses at least one of a microphone and speaker database for use in a speaker calibration system, under some embodiments.

One or more databases can also be used to store and retrieve microphone system specifications. As mentioned above, part of the second requirement was that the microphone system be known, so that any distortions detected would not be mistakenly associated with the speakers rather than the microphone system. This also means that if this requirement is not met, it may not be possible for the system to function as intended. To overcome this problem, a database of microphone system specifications is created or a pre-defined database is accessed. This is similar to the use of a database of connected speaker specifications. In some modes of operation, the system may be configured to use two databases, one for the microphone system information and another for the speaker devices. FIG. 5 illustrates a system that uses at least one of a microphone and speaker database for use in a speaker calibration system, under some embodiments. As shown in system 500 of FIG. 5, an original signal from source 510 is input to device output stage 508 of a device 502 for transmission to speaker(s) 504. It is also input to a processing component 506 so that the output stage transmits both the original 503 and processed signals 505 the speakers. The output signal 507 from the speakers 504 is picked up by microphone 510 and this signal is passed to the processing component 506 for performing certain optimization (e.g., calibration/tuning) processes. The optimization processes are informed by certain information provided by a speaker profile database 514 and a microphone (MSI) database 512. The speaker profile database provides the speaker profile information as discussed above, and the microphone database provides certain microphone information that can also (or instead) be used by the processing component 506.

The microphone database 514 includes certain microphone system information, such as the microphone model, firmware platform/version, and enclosure type. Together with the response of this system to sounds from reference speakers, this information is termed the "microphone system information" or MSI. With respect to microphone devices, there can be a number of cases that can be catalogued. The case of new, certified devices is generally the most straightforward case. When a new device is released, it may be tested for frequency response using reference speakers. The MSI shall be stored both in a database and on the device itself, where it shall be surfaced to the overall processing system for all copies of the shipped device. If, for any reason, the processing system cannot obtain the MSI from the device itself, it can obtain it from the database 512, or receive updated information from the database. A microphone device may also join the program after launch as in the case of existing, later certified devices. In this case, the testing to obtain the MSI occurs after the device is already on the market, but the processing system shall obtain the MSI from the online database 512. It will notify the user that the system is now available for use. Device data can also be crowdsourced from users who contribute to the database, though their contributions would be treated differently than certified contributions (e.g., those from device manufacturers or the processing system designer). A crowdsourcing program can be created and/or utilized that explains how to conduct testing and contribute to the MSI, and that defines best practices to follow for verifying crowdsourced contributions. Some devices may be classified as partially known devices. In this case, a device has some or all microphone system components as other devices. For example, a new device not in the database 512 might have the same microphone and firmware as another device or devices, but an unknown mic enclosure. In this case, a database query system shall compare the frequency responses of the closest similar options. If there is similarity, the query system shall utilize, possibly with confirmation from the user, the frequency response for the most similar system(s), or an average of those responses.

Embodiments of the database implementation of FIG. 5 can also be used in the case of unknown signals, and the use of an external ACR component, service, or process 412, such as that shown in FIG. 4.

Speaker Tuning

Figure 6:
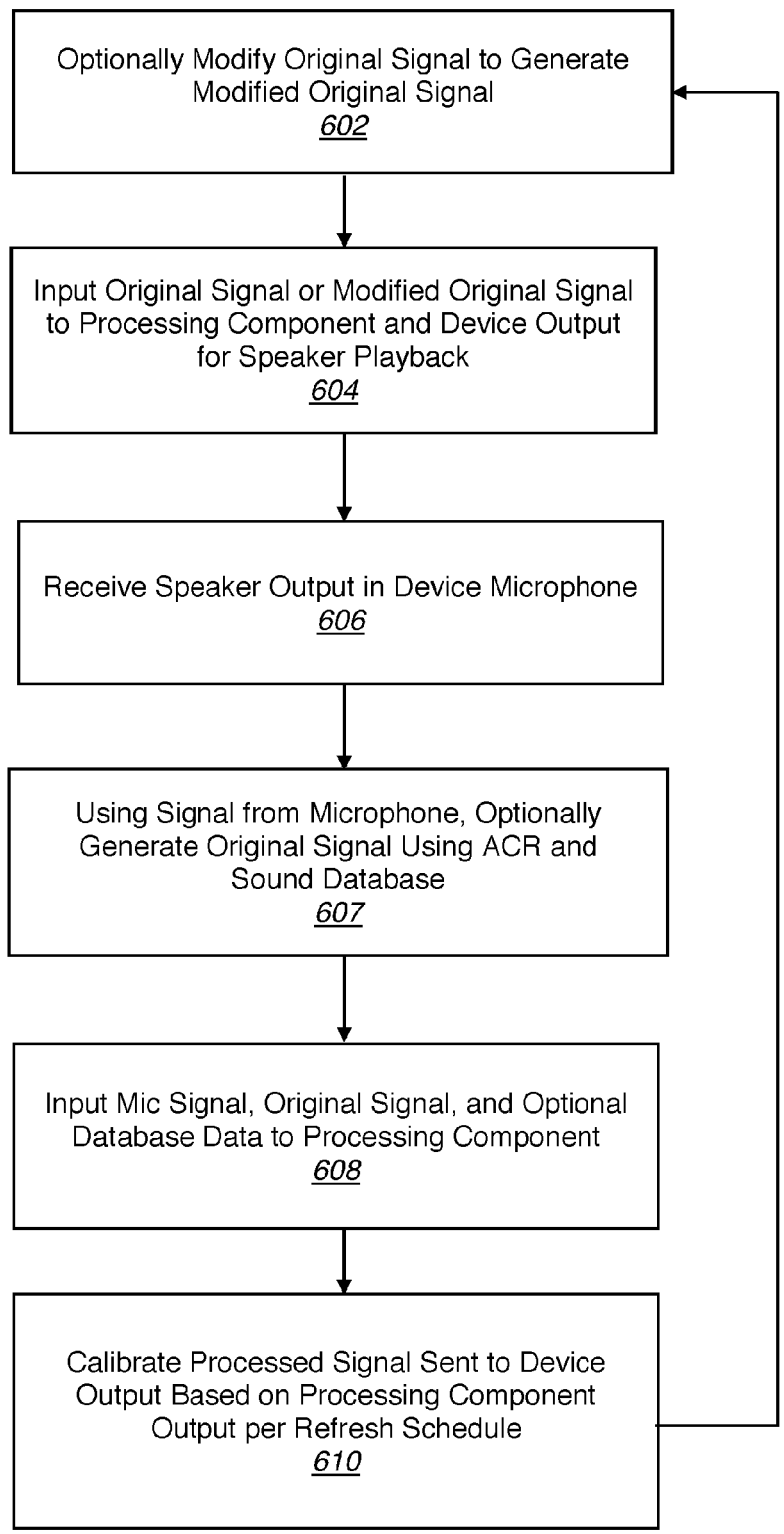
FIG. 6 is a flowchart that illustrates a method of performing speaker calibration, under some embodiments.

The calibration system uses the device microphone (or a connected microphone) to listen to sound from the device speakers and inform modifications to that sound. FIG. 6 is a flowchart that illustrates a method of performing speaker calibration, under some embodiments. In many cases, the speaker output sound is processed to more closely match an original signal sound as it is provided by an audio source. However, in certain cases it may be desired to modify the sound, thus as shown in FIG. 6, the process may start with an optional step 602 of modifying an original signal (e.g., song, TV show, etc.) to generate a more ideal test signal, such as through addition of virtual bass or through spectral flattening, or other similar process, such as adding special effects sounds to make the original audio content or arbitrary test signal more of a perfect test signal. The signal that is used to calibrate or tune the speakers is thus not a predefined test signal (e.g., pink noise) as used in present systems, but rather a signal that is or is derived from an audio source and that is (or will become, as shown in step 607) known to the system. The original signal or step 602 modified signal (both referred to as the original signal) are input to a processing component and device output for speaker playback, step 604.

The original audio signal is then played back from the internal or external device speaker or speakers, and this speaker output is then received by an internal or external microphone, step 606. In the case where the original audio signal is not known to the system, the original signal may be generated by using ACR or other similar methods, optional step 607, such as for the embodiment shown in FIG. 4. The original signal and the mic signal are input to the processing component, step 608. Certain device information, such as speaker and/or microphone data may also be provided to the processing component to inform the calibration algorithms that optimize the processed sound for output to the speakers, and which is performed as shown in step 610. In step 610, the processing module compares the signal it receives from the microphone with the "more ideal test" signal, which is what it is sending to the speakers. The processing module then adjusts the signal through certain audio processing functions to make it sound better, i.e., more closely match the original signal. For a mix of digital and analog signals, appropriate digital-to-audio (DAC) and analog-to-digital (ADC) procedures may be performed as needed.

In an embodiment, the processing module can be configured to perform this optimization operation once, periodically or continuously. Thus, for optimum operation, the calibration component may be configured to execute its functions at specific times. As shown in FIG. 6, the calibration step 610 is performed in accordance with a refresh schedule, and the process repeats from step 602 as shown in FIG. 6. In an embodiment, the calibration process may include an automatic refresh of custom speaker tuning. With respect to refreshing, there are three basic options. The first is to refresh only upon prompt. In this mode of operation the system refreshes its settings only when prompted by the user. A second option is a continuous refresh in which the system continuously monitors output and updates parameters. This has the benefit of quickly detecting changes in environment, without user interaction, but generally requires more system power to utilize the microphone and process signals. A third mode is an optimized automatic refresh mode in which the system automatically updates the parameters of the output signal under certain conditions, with reduced or no user interaction.

In the optimized automatic refresh mode there may be different conditions for triggering an update (or return to previous settings) based on parameters such as the user (and device) location, device type, content or content change, temporal factors, and other similar characteristics. With regard to refresh based on location, a "previous location" mode may trigger a refresh if the device recognizes that it changed location to a previously known location, and it may choose the previous profile for that location. In a "change of location" mode, if the device detects that a user has changed location significantly (as defined in accordance with preset distance values) it may trigger a refresh. Limits on this may be set by the user, with some reasonable default, such as 20 feet. This way, if a user moved to a car, or a different room where the acoustics are likely to be different, the system could choose to update. This is especially useful in cases where a user connects using a headphone jack, and there is no indication to the processing layer that a new speaker device is connected.

A refresh may also be triggered based on frequency content. In this case, when using an arbitrary test signal (which may not contain all frequencies like a predefined test signal) the system shall update when the signal frequency content changes substantially. For example if it changes from narrowband speech (e.g., a radio talk program) to wideband music (e.g., a popular song with many instruments, voices and percussion). Such change can be detected using any number of standard methods including spectral centroid, or an increase in the number of critical band filters whose response is within 20 dB of the maximum. Furthermore, for efficiency, the refresh shall not be triggered just by a measurable change, but rather only by a change that exceeds a predetermined or dynamic threshold.

A refresh may also be triggered by device type or profile, as described above. For example, if the system understands from a Bluetooth handshake or other means that a new speaker device is connected, it should update to use that speaker profile or load a previous file. It might also use this to perform a refresh if the newly connected speaker device is not known, or to refine the tuning for a known device. Temporal or timing factors can also be used to trigger a refresh. Thus, even if location information about a device is not available, the device could auto-update if a significant amount of time has elapsed, such as a number of days (absolute time) or an hour of playback (playback time).

As shown in FIG. 1, a GUI 130 may be provided to provide interaction between the user and the device. In an embodiment, the GUI may be provided by an application provided in the device itself and that interacts with the user through a visual output display and interactive touchpad or programmed control buttons for input by the user. Certain existing buttons on devices, such as volume and power may be adapted for use by the calibration component. In an embodiment, the GUI presents a system menu that has a number (e.g., four) operating options. These options set the state of the device with respect to speaker calibration, and include an "off" state in which the system does not activate, and the interface makes it clear that no optimization is being performed; and a "refresh" state that is used to trigger an instant refresh, during which an animated screen may be briefly shown to the user (during the time with refreshing), suggesting or instructing that the user avoid talking or other sounds for a moment. A "recents" state can be used to bring up a list of recent results, which would be listed with their time and location, for example "5 pm Nov. 10, 2014 in Hayes Valley, San Francisco, Calif.," which would all the user to choose such an option. An "automatic" mode can be provided to show the user a quick confirmation that the device will refresh automatically when music plays. It can also be configured to show a pulsing icon or logo briefly before minimizing itself, and then the button that activates the system menu would also continue to glow or pulse in settings where it is shown.

The GUI can also be configured to provide certain user input tools to allow users to set parameters regarding the "quality" of the playback. For example, the user interface would have two or three preset settings or an optional slider between any two, where example presets include: most authentic, best match for my speakers, or loudest. Other similar qualitative settings, or GUI elements may also be used.

The above GUI features are intended to be example features only and any number of other or additional user input and output functions and features may be provided through a GUI component 130 associated with the speaker calibration component 112.

Through the use of known or derived known signals to generate a test signal, along with certain device profile information sourced by data sources, the speaker calibration system optimizes audio content for playback through speakers connected to devices with microphones, such as mobile phones and portable/tablet computers.

Aspects of the methods and systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. In an embodiment in which the network comprises the Internet, one or more machines may be configured to access the Internet through web browser programs.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for calibrating sound played through speakers of a device having a microphone in an enclosure, comprising:
    inputting an original audio signal to a processing component and an output stage of the device for playback through the speakers;
    receiving playback sound output from the speakers through the microphone to generate a microphone signal, wherein the enclosure is a unitary enclosure housing both the speakers and microphone in the same device; and
    inputting the microphone signal into the processing component to calibrate the speakers for optimal playback of the original audio signal, wherein the processing component is configured to compare the original audio signal to the microphone signal and correct the microphone signal by one or more audio processing functions in accordance with a refresh schedule.

2. The method of claim 1 wherein the original audio signal generating the microphone signal comprises actual program content desired to be listened to by the user, and wherein optimal playback of the original audio signal comprises tuning a characteristic of the original audio signal to produce output sound sufficiently pleasing to the user relative to a qualitative scale, the characteristic selected from the group consisting of: frequency response, frequency distribution, gain, and timbre, the method further comprising providing a graphical user interface having a plurality of preset parameters providing the qualitative scale including most authentic, best match for speakers, and loudest.

3. The method of any of claim 1 further comprising inputting one or more device characteristics into the processing component to further calibrate the speakers.

4. The method of claim 3 wherein the device characteristics comprises at least one of speaker characteristics and microphone characteristics, the method further comprising obtaining the device characteristics from one or more databases accessible by the device.

5. The method of claim 4 wherein the speaker and microphone characteristics each comprise make, manufacturer, and type of device, and wherein the databases are populated with data provided from at least one of: a manufacturer, a certification body, and a group of users.

6. The method of claim 3 further comprising:
    determining the presence of suspicious audio data input to the microphone;
    filtering the suspicious audio data to preserve integrity of the microphone signal input to the processing component, and wherein the suspicious audio data is selected from the group consisting of background noise, talking, wind noise, and physical movement noise.

7. The method of claim 6 further comprising determining if sufficient information exists for the processing component to provide to the original audio signal to calibrate the speakers based on a signal to noise ratio of the microphone signal, and in the case that insufficient information exists, waiting until sufficient information exists or prompting the user to increase volume of the original audio signal until sufficient information exists.

8. The method of claim 7 wherein, if insufficient information exists, the method further comprises inputting a supplemental signal to the processing component, the supplemental signal selected from the group consisting of: a pre-defined broadband signal, a combined test signal and the output signal, a spectrally flattened version of the output signal, and a frequency boosted version of the original audio signal.

9. The method of claim 6 further comprising calibrating the speakers for optimal playback of the original audio signal according to a defined tuning update schedule comprising at least one of: a prompted update, a continuous periodic update, and an automated update.

10. The method of claim 9 wherein the update is triggered by one of: change of location of the device, change in content comprising the original input audio, change of time of use of the device, and change in type of speaker or microphone.

11. The method of claim 1 wherein the speakers comprise one of an internal speaker integrated in the device or an external speaker connected to the device through a wired or wireless link, and wherein the microphone comprises one of an internal microphone or an external microphone connected to the device through a wired or wireless link.

12. The method of claim 1 further comprising:
defining default tuning settings to modify the microphone signal; and
defining one or more limit values to limit the tuning settings.

13. The method of claim 12 wherein the default tuning settings comprise settings that allow the system to not deviate from the default tuning of a given speaker by more than 10 dB.

14. A system for calibrating sound played through speakers of a device having a microphone, comprising:
an audio source inputting an original audio signal to a processing component and an output stage of the device for playback through the speakers;
the microphone receiving playback sound output from the speakers to generate a microphone signal;
an enclosure housing the speakers and a microphone in a single unitary device; and
a processing component receiving the microphone signal to calibrate the speakers for optimal playback of the original audio signal, wherein the processing component is configured to compare the original audio signal to the microphone signal and correct the microphone signal by one or more audio processing functions in accordance with a defined refresh schedule.

15. The system of claim 14 wherein the original audio signal generating the microphone signal comprises actual program content desired to be listened to by the user, and wherein optimal playback of the original audio signal comprises tuning a characteristic of the original audio signal to produce output sound sufficiently pleasing to the user relative to a qualitative scale, the characteristic selected from the group consisting of: frequency response, frequency distribution, gain, and timbre, the system further comprising a graphical user interface having a plurality of preset parameters providing the qualitative scale including most authentic, best match for speakers, and loudest.

* * * * *